United States Patent Office 3,530,241
Patented Sept. 22, 1970

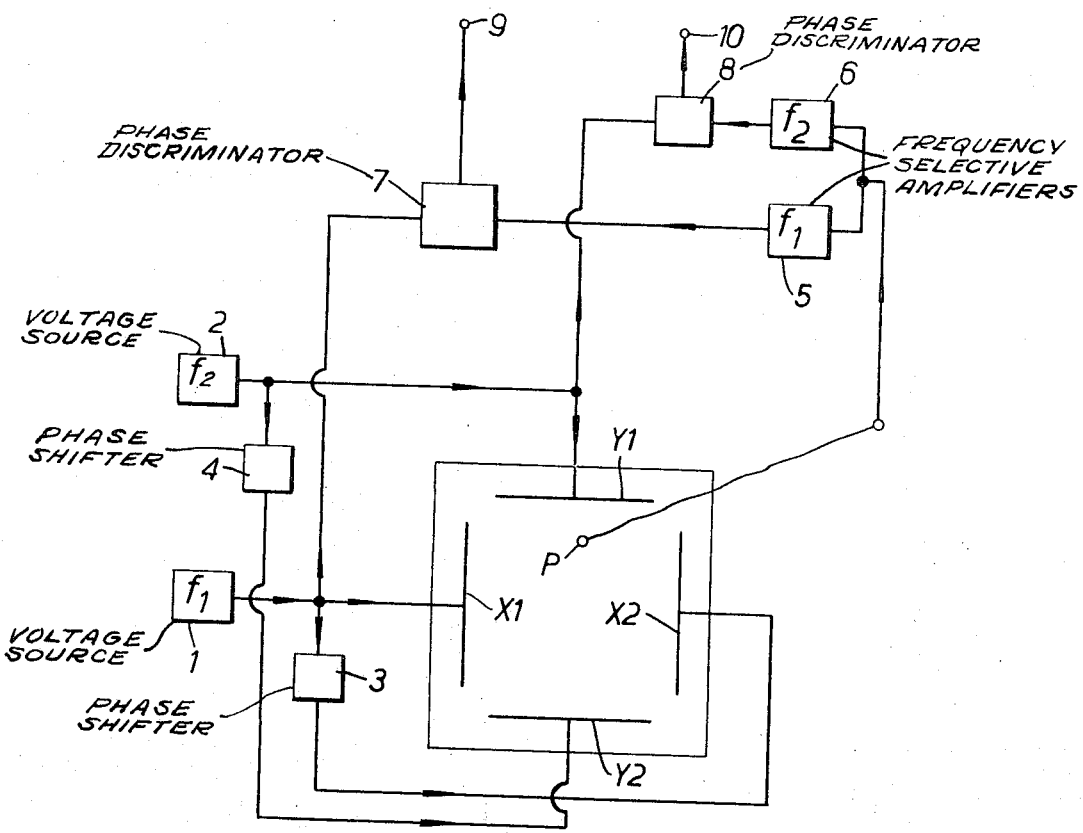

3,530,241
ELECTRICAL POSITION RESOLVER ARRANGEMENTS
Alfred Brian Edwin Ellis, Chelmsford, England, assignor to The Marconi Company Limited, London, England, a British company
Filed Nov. 24, 1967, Ser. No. 685,369
Claims priority, application Great Britain, Dec. 23, 1966, 57,565/66
Int. Cl. G08c 21/00
U.S. Cl. 178—19                                    7 Claims

ABSTRACT OF THE DISCLOSURE

An electrical position resolver which includes a resistive surface layer to which electrical connection is made by two co-ordinately positioned pairs of strips is described. Input signals of one frequency are applied to one pair of strips with the phase of the signal applied to each strip being different. Input signals of a second frequency are applied to the other pair of strips with the phase of the signal applied to each strip being different. A probe is arranged to couple signals from the resistive surface, via filters which pass respectively signals of the one frequency and the second frequency to phase detectors. Reference phase inputs to the phase detectors are provided from the sources of signals of the one frequency and the second frequency. The outputs from the phase detectors indicate the position of the probe along X and Y co-ordinates.

---

This invention relates to what are herein termed electrical position resolver arrangements that is to say devices wherein the position of a member relative to a surface across which said member is movable is resolved and translated into two electrical signals representative respectively of the two co-ordinates of position of said member. More specifically the invention relates to arrangements including electrical position resolvers of the kind wherein the surface is provided with a resistive layer to which connection is made by means of two pairs of parallel strips, those of one pair being perpendicular to those of the other, and different input frequencies are applied between the strips of each pair, the movable member being a pick-up probe which is movable over said surface and is adapted to pick up signals which are compounded of the different input frequencies and which can then be separated into the different frequency components to derive component signals representative of the co-ordinates of the position of the probe on the surface.

In known electrical position resolver arrangements of the kind referred to co-ordinates of the position of the probe at any time are represented by the amplitudes of the components of different frequency in the signals picked up by the probe, operation of the arrangement being based on the fact that the amplitude of one component frequency will depend upon the position of the probe in one co-ordinate direction the amplitude of the other component frequency being likewise dependent on the position of the probe in the other co-ordinate direction. In practice the output from the probe is filtered to separate the two frequency components and the separated components amplified and rectified, the resultant D.C. signals being representative of the co-ordinates of the position of the probe. These signals can be utilised in any desired way, e.g. fed into a computer or presented to a display device such as a cathode ray tube, or employed to perform a desired control function.

Known amplitude dependent electrical position resolvers of the kind referred to and as above described have two important practical defects. The first is that the range ratio of amplitudes of either frequency which must be produced when the probe is moved through its complete range of movement in the corresponding co-ordinate direction must be inconveniently large, if the position resolution of the arrangement is to be good. Thus, to quote a practical figure, if an accuracy of 1% is to be achieved the range ratio of amplitudes should be at least 100:1. The second defect is that changes in component signal amplitudes produced by causes other than movement of the probe—for example variations in the distance of the probe from the resistive layer across which it is moved (and such variations can be produced, for example, by non-uniformity of thickness of the insulating layer normally provided over the resistive layer to protect the latter)—will adversely affect the accuracy. The present invention seeks to provide improved electrical position resolver arrangements of the kind referred to in which these defects will be much reduced.

According to this invention an electrical position resolver arrangement comprises a position resolver including a resistive surface layer to which connection is made by means of two co-ordinately positioned pairs of strips; means for applying an alternating voltage input of one frequency to the strips of one pair with the phase of the input to one of the strips of said pair different from and in pre-determined relationship with the phase of the input to the other strip of said pair; means for applying an alternating input of a different frequency to one strip of the second pair with the phases of the inputs to the strips of the second pair also different and in pre-determined relationship; a probe which is movable with respect to said surface layer; means for separating the different component frequencies present in signals picked up by said probe; and means for determining the phases of the separated different component frequencies to produce signals representative of the co-ordinates of position of the probe in relation to the resistive layer.

Preferably connection is made to the resistive layer in the manner customary in known position resolver arrangements of the kind referred to i.e. by means of two mutually perpendicular pairs of strips, said strips being disposed along the edges of a rectangular area of the resistive layer.

Preferably the inputs of each frequency applied to the two strips of the pair to which said frequency is applied are applied to the strips of said pair in phase quadrature.

The invention is illustrated in the accompanying drawings which shows in simplified diagrammatic manner one embodiment thereof.

The arrangement shown in the drawing includes a resolver which is known per se and which consists of a base plate A, e.g. a glass plate which might, in a typical practice, be a square plate with a side of, say, 10″, on which is deposited a thin layer (not separately shown) of suitable resistive material. Connection to the resistive material is made by means of two pairs X1, X2 and Y1, Y2 of connecting strips lying along the sides of a square the strips of each pair being parallel. The resistive layer deposit is covered with a hard insulating layer to protect it and a probe P is movable over the insulating layer, making capacitative coupling with the resistive layer through the insulating layer at whatever position the probe may occupy.

Two different frequencies $f_1$ and $f_2$ are provided by sources 1 and 2 respectively. Voltage from source 1 is applied directly to the strip X1 and through a 90° phase shifter 3 to the strip X2. Similarly voltage from source 2 is applied directly to the strip Y1 and through a 90° phase shifter 4 to the strip Y2. Output picked up by the probe P is separated into its two component frequencies by frequency selective amplifiers 5, 6 responsive selectively to the frequencies $f_1$ and $f_2$ respectively. Output from unit 5 is fed to a phase discriminator or detector 7 to which is also fed a reference phase which is that applied to one of strips X1 and X2—as shown the strip X1. Similarly output from unit 6 is fed to a phase discriminator or detector 8 to which is also fed a reference phase which is that applied to the strip Y1. The position co-ordinate representative signals appear at the output terminals 9 and 10, that at 9 being dependent on the phase of the picked up signals of frequency $f_1$ and therefore of the position co-ordinate in the direction X1–X2 and that at 10 being dependent on the phase of the picked up signals of frequency $f_2$ and therefore of the position co-ordinate in the direction Y1–Y2. Amplifiers and amplitude limiters (not shown) may be provided as requisite and in accordance with principles well known per se to ensure that the phase discriminators shall be, in operation, as independent as possible of input amplitudes and dependent only on input phases.

As will be appreciated the defects hereinbefore mentioned of the hitherto known arrangements are greatly reduced by this invention which presents the further advantage that phase measurement lends itself to accomplishment, in known manner, by digital methods, so that the useful signals at terminals 9 and 10 may readily be arranged to be in digital form which is, of course, a form well suited to use of the said signals as direct inputs to a computer.

I claim:

1. An electrical position resolver arrangement comprising a position resolver including a resistive surface layer to which connection is made by means of two co-ordinately positioned pairs of strips; means for applying an alternating voltage input of one frequency to the strips of one pair with the phase of the input to one of the strips of said pair different from and in pre-determined relationship with the phase of the input to the other strip of the pair; means for applying an alternating voltage input of a different frequency to the strips of the second pair with the phases of the inputs to the strips of the second pair also different and in pre-determined relationship; a probe which is movable with respect to said surface layer; means for separating signals of the said one and said different frequencies present in signals from each of the strips picked up by said probe; and phase discriminator means for determining the phases of the separated signals of said one and said different frequencies with respect to signals of reference phase related to said alternating voltage input of one frequency and said alternating voltage input of a different frequency respectively to produce signals representative of the co-ordinates of position of the probe in relation to the resistive layer.

2. An arrangement as claimed in claim 1 wherein connection is made to the resistive layer by means of two mutually perpendicular pairs of strips forming said two co-ordinately positioned pairs of strips, said strips being disposed along the edges of a rectangular area of the resistive layer.

3. An arrangement as claimed in claim 2 wherein the inputs of each frequency applied respectively to the two strips of each pair of strips are applied in phase quadrature.

4. An electrical position resolver arrangement comprising a position resolver including a resistive surface layer to which connection is made by means of two co-ordinately positioned pairs of strips; means for applying a first alternating voltage input of one frequency to the strips of one pair with the phase of the input to one of the strips of said pair different from and in pre-determined relationship with the phase of the input to the other strip of said pair; means for applying a second alternating voltage input of a second frequency to the strips of the other pair with the phases of the inputs to the strips of the second pair also different and in pre-determined relationship; a probe which is movable with respect to said surface layer; means for separating signals of the said one and said second frequencies present in signals from each of the strips picked up by said probe; and phase discriminator means for determining the phase of the separated signals of said one and said second frequencies with respect to phase of said first alternating voltage input and phase of said second alternating voltage input respectively to produce signals representative of the co-ordinates of position of the probe in relation to the resistive layer.

5. An arrangement according to claim 4 wherein said phase discriminator means comprise a first phase detector having a first input thereof coupled to said means for applying a first alternating voltage input and a second input thereof coupled to said means for separating signals of said one and said second frequencies for applying to said first detector a signal of said first frequency, and a second phase detector having a first input thereof coupled to said means for applying a second alternating voltage input and a second input thereof coupled to said means for separating signals of said one and said second frequencies for applying to said second detector a signal of said second frequency.

6. An arrangement according to claim 4 wherein the inputs of each frequency applied respectively to the two strips of each pair of strips are applied in phase quadrature.

7. An arrangement according to claim 5 wherein the first input to each of said phase detectors is connected to one of said strips of respective pairs of strips.

References Cited

UNITED STATES PATENTS 2,925,467   2/1960   Becker _____ 178—18

THOMAS B. HABECKER, Primary Examiner

M. M. CURTIS, Assistant Examiner

U.S. Cl. X.R.

178—18; 235—185; 307—149

PO-1050
(5/69)

UNITED STATES PATENT OFFICE
CERTIFICATE OF CORRECTION

Patent No. 3,530,241      Dated September 22, 1970

Inventor(s) Alfred Brian Edwin Ellis

It is certified that error appears in the above-identified patent and that said Letters Patent are hereby corrected as shown below:

In the patent heading, the expression "Claims priority, application Great Britain, Dec. 23, 1966, 57,565/66" should be changed to read --Claims priority, application Great Britain, Dec. 23, 1966, 57,656/66--.

Signed and sealed this 11th day of May 1971.

(SEAL)
Attest:

EDWARD M. FLETCHER, JR.
Attesting Officer

WILLIAM E. SCHUYLER, JR.
Commissioner of Patents